US005973045A

United States Patent [19]

Dowling et al.

[11] Patent Number: 5,973,045

[45] Date of Patent: Oct. 26, 1999

[54] ADHESION PROMOTER COMPOSITIONS

[75] Inventors: Joseph P. Dowling; Sarah C. Hogan, both of Dublin, Ireland

[73] Assignee: Loctite Corporation, Hartford, Conn.

[21] Appl. No.: 09/223,259

[22] Filed: Dec. 30, 1998

Related U.S. Application Data

[63] Continuation of application No. 07/981,886, Nov. 25, 1992.

[51] Int. Cl.[6] ................................ C08J 3/00; C08K 5/09; C08K 5/10; C08L 75/00

[52] U.S. Cl. .......................... 524/270; 524/284; 524/306; 524/589; 524/590

[58] Field of Search .................................... 524/589, 590, 524/270, 284, 306

[56] References Cited

U.S. PATENT DOCUMENTS

| | | |
|---|---|---|
| 4,049,601 | 9/1977 | Anderson . |
| 4,087,392 | 5/1978 | Hartmann et al. . |
| 4,456,718 | 6/1984 | Brinkman et al. . |
| 4,581,281 | 4/1986 | Gerace . |
| 4,622,357 | 11/1986 | Tsuchida et al. . |
| 4,963,636 | 10/1990 | Mülhaupt et al. . |
| 5,107,069 | 4/1992 | Wichelhaus et al. . |
| 5,130,375 | 7/1992 | Bernard et al. . |

FOREIGN PATENT DOCUMENTS

| | | |
|---|---|---|
| 278888 A1 | 8/1988 | European Pat. Off. . |
| 2214206 | 10/1973 | Germany . |
| 2212169 | 7/1989 | United Kingdom . |

OTHER PUBLICATIONS

Noller, Chemistry of Organic Compounds, p. 771, 1957.

*Primary Examiner*—Patrick D. Niland
*Attorney, Agent, or Firm*—Hoffmann & Baron, LLP

[57] ABSTRACT

An adhesion promoter composition useful on metallic and plastic surfaces and particularly useful in improving the adhesion of polyurethane adhesives. These compositions contain a suitable prepolymer which is compatible and/or functionally reactive with the adhesive, an ester such as maleic-modified esters of rosin or dialkylmalonates, and a suitable non-reactive solvent carrier.

17 Claims, No Drawings

ADHESION PROMOTER COMPOSITIONS

This application is a continuation of copending application Ser. No. 07/981 886, filed on Nov. 25, 1992.

BACKGROUND OF THE INVENTION

The present invention relates to compositions useful as adhesion promoters or primers for treating surfaces prior to bonding. In particular, these compositions contain interactive and/or compatible prepolymers and one or more adhesion promoters for improving initial adhesion and durability of the bond at the adhesive/substrate interface. The present compositions are preferably designed for use in conjunction with polyurethane adhesive compositions and have particularly enhanced adhesive promoting properties when used on metal surfaces.

Surface preparation of substrates prior to bonding is common and often required to achieve strong adhesive bonds. In addition to mechanical surface treatments, such as roughening the substrate surface, chemical treatments have been employed. These chemical treatments may modify the physical surface structure, such as by etching, anodizing or cleaning the surface, or may serve as coatings which provide a mutually compatible interface layer between the underlying substrate and the adhesive. These pre-treatment coatings serve the purpose of promoting the formation of physical and chemical intermolecular forces, thereby enhancing the strength of the adhesive bonds. For example, organosilicone compounds, either applied as a primer or incorporated into the adhesive per se, have been used to improve the strength and provide enhanced resistance to humid conditions. These adhesion promoters have been widely used in the manufacture of glass fiber-reinforced plastics to improve the adhesion between glass fibers and the matrix resin. For example, U.S. Pat. No. 4,456,718 discloses organosilicon promoters having two or three alkoxy groups and a functional organic group. These adhesion promoters, which are conventionally employed in many current applications, have the general formula:

$$(RO)_3SiCH_2CH_2CH_2X$$

wherein R is $C_{1-4}$ alkyl and x is a functional organic group such as an amino, hydroxy, vinyl, methacrylate or epoxy group. The adhesion promotion properties imparted by these compounds is believed to be due to the chemical and physical reaction of the organosilicon compounds at the interface of substrate and polymer (adhesive). Other useful adhesion promoters well known in the art include organotitanates, organic chromium and zirconium complexes.

Known adhesion promoters include isocyanate-based products having a high content of isocyanate groups, as well as organofunctional silanes and siloxanes. These materials are generally highly reactive and require special care in their preparation and storage. Many non-ferrous metals such as aluminum, copper and zinc bichromate are difficult materials on which to achieve good adhesion both initially and during subsequent exposure to heat and humidity. These conventional adhesion promoters have only limited efficacy on non-ferrous metals or metals with modified surfaces.

Adhesion promoters have been used both in primer compositions, as well as directly in the adhesive formulations. For example, abietic acids and rosin esters have been disclosed as useful tackifiers in polyurethane pressure-sensitive adhesive compositions. U.S. Pat. No. 4,037,392 discloses esters of rosin such as the pentaerythritol methyl ester, propyl ester, ethylene glycol and glycerol esters, as well as esters of hydroabietyl alcohol such as the benzoic and phthalic esters thereof, useful as tackifiers to achieve enhanced adhesion properties of polyurethane pressure-sensitive tapes.

More recently, U.S. Pat. No. 5,207,069 discloses heat-activated adhesion promoters for treating surfaces prior to bonding. These promoters are applied directly to the surface, as opposed to incorporated in the adhesive composition, and include a solvent mixture of a carbonyl compound with at least one unsaturated activated bond and a polymer containing a functional group. Examples of useful carbonyl compounds disclosed include unsaturated dicarboxylic acids and esters thereof such as esters of maleic, crotonic and fumaric acids. Those polymers disclosed include materials having carboxylic, amine or hydroxy groups such as polyesters, polyamides, polyethers, polyacrylates and polyurethanes. The promoters require heat activation in order to achieve their intended function.

There is a need for an adhesion promoter designed especially for metallic surfaces which improves the adhesion characteristics of various adhesive systems without the use of heat or additional surface treatment, which is an effective under ambient conditions and which gives rise to enhanced adhesion durability under conditions of heat and humidity.

SUMMARY OF THE INVENTION

The present invention is directed to an adhesion promoter composition for treating substrate surfaces, particularly metal, plastics, synthetic composites and wood, prior to bonding. For purposes of this invention, the terms "adhesion promoter" and "primer" will be used interchangeably and will have the same meaning. In a preferred embodiment, the inventive primer compositions include: (i) an ester selected from the group consisting of maleic-modified esters of rosin, dialkylmalonates and mixtures thereof; (ii) a polyisocyanate prepolymer; and (iii) a suitable solvent. The maleic-modified ester of rosin component is preferably chosen from such materials as glycerol ester, pentaerythritol ester, ethylene glycol ester and mesitylene glycerol ester. The dialkyl malonates include the $C_{1-10}$ alkyl esters of malonic acid, such as methyl, ethyl and butyl malonates and mixtures thereof. Of particular usefulness is the combination of esters of rosin and the dialkylmalonate in the isocyanate-based solution. The primers of the present invention are especially designed for polyurethane adhesives and serve particularly well on metallic substrates. However, as will be discussed herein, the primers may be useful with other types of adhesives and on non-metallic substrates such as plastics, synthetic composites and wood.

The present invention also relates to a method of improving the adhesion of polyurethanes to metallic substrates as well as to naturally difficult to bond to substrates such as non-ferrous surfaces and plastic materials.

DETAILED DESCRIPTION OF THE INVENTION

The adhesion promoter compositions of the present invention are preferably designed for use with polyurethane-based adhesive compositions. The prepolymer present in the adhesion promoter composition is chosen for its compatibility, physically or chemically, with the adhesive. Thus, in the case of polyurethane-based adhesives, the adhesion promoter composition contains a polyisocyanate prepolymer which is both compatible and functionally reactive with the polyurethane adhesive. Similarly, other prepolymers may be chosen to fit a particular adhesive composition. For example, where epoxy resins are chosen as the adhesive, the adhesion promoter may contain ethoxylated bisphenol A or epoxy novalac resins as the prepolymer. On the other hand, in the case of polyamides or polyacrylates, the prepolymer in the adhesion promoter composition may be selected from such prepolymers as polyesterurethane diacrylate. Thus, it should be understood that the particular prepolymer used in the primer can be selected from a wide variety of materials which are compatible with and/or contain functional groups that are reactive with the adhesive employed. While the present adhesive promoter compositions are particularly intended for polyurethane-based adhesive compositions and accordingly contain a polyisocyanate prepolymer, the choice of prepolymer and adhesive can be varied to fit a particular application or property profile. The specific prepolymer therefore is chosen as a compatibilizing intermediate material.

Without wishing to be bound by any particular theory, the compositions are believed to provide enhanced adhesion through better surface wetting and formation of a chemical and/or mechanical bond to the substrate and adhesive.

The esters present in the adhesion promoter compositions are selected from the group consisting of maleic-modified esters of rosin, dialkylmalonates and mixtures thereof. The maleic-modified esters of rosin include the maleic-modified glycerol ester of rosin, maleic-modified pentaerythritol ester of rosin, ethylene glycol ester, mesitlyene glycerol and mixtures thereof. The maleic-modified aspect of these esters appears to be significant in providing enhanced adhesion, as demonstrated in the Examples provided herein. For example, when similar esters of rosin are used which have not been maleic-modified, the adhesion to identical substrates drops significantly during exposure to heat and humidity conditions. This is in contrast to the maleic-modified esters of rosin, which maintain their adhesion for longer periods of heat and humidity exposure before a decrease in adhesion strength is initiated. In addition to the maleic-modified esters of rosin, dialkylmalonates are useful alone or in combination with the maleic-modified esters. Among the dialkylmalonate useful in the present invention include $C_{1-10}$ alkyl esters of malonic acid such as the methyl, ethyl and butyl malonates. Among the preferred dialkylmalonates is diethylmalonate.

The dialkylmalonates may be present in the present invention in amounts of about 0.1% to about 10% by weight and preferably about 0.2% to about 2% by weight of the composition.

Rosin is a complex mixture of organic substances generally produced by pine trees. After purification, it consists mainly of rosin acids which are predominately abietic acid and its isomers. Rosin and its derivatives are susceptible to oxidation by air, forming products which are not necessarily desirable. Hydrogenation is one known method of stabilizing these materials.

The structure for abietic acid and its hydrogenated forms are given below:

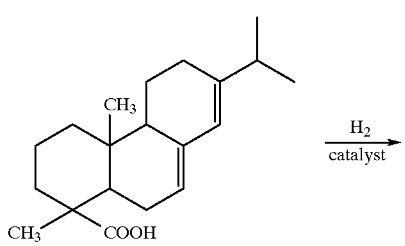

Abietic acid

-continued

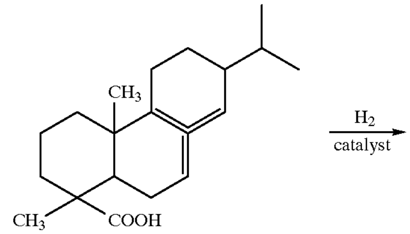

Dihydroabietic acid

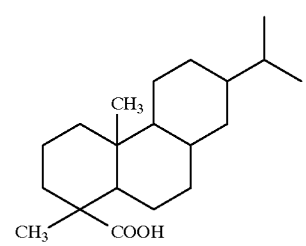

Tetrahydroabietic acid

The preferred esters of rosin of the present invention are maleic-modified esters.

The rosin ester component of the present invention may be present in amounts of about 5 to about 20% by weight and preferably about 10 to about 15% by weight of the composition. These ranges are limited to some degree by the hygroscopic nature of these materials, which in amounts greater than 20% may cause stability problems. This range, however, may deviate where other ingredients are incorporated which will counteract such an effect.

It has been discovered that when dialkylmalonates are present in the composition in the absence of maleic-modified rosin esters, it is preferable to have a thickening agent present, such as a polyester resin. This is believed to be due to the need for sufficient solids content in the composition to be present to obtain a substantially continuous film. Significant gaps in the film continuity may result in a loss of adhesion.

It should be understood that the polyisocyanate prepolymer used in the preferred embodiment of the present invention may be chosen from aromatic or aliphatic polyisocyanate prepolymers conventionally used in the art. For example, such prepolymers include the reaction of diisocyanates such as 4,4'-diphenylmethane diisocyanate (MDI), toluene diisocyanate (TDI), 1,6-hexamethylene diisocyanate (HDI) or isophorone diisocyanate (IPDI) with polyesterpolyols or polyetherpolyols of molecular weight of about 200 to about 2000, e.g., those sold under the tradename Desmophen by Bayer AG. The prepolymers may be present in the inventive compositions in amounts of about 2% to about 40% and preferably about 10% to about 20% by weight of the composition. These prepolymers have a molecular weight and the range of about 500 to about 10,000.

The solvent carrier for the inventive compositions may be selected from any suitable solvent which is substantially unreactive with the prepolymer and the ester components. In the case of isocyanate prepolymers, the solvent should be aprotic. Examples of such solvents are ketones, esters and hydrocarbons. The solvent allows for an intimate solution of ester and prepolymer to be formed which when deposited on the substrate allows for proper surface wetting, uniformity and continuity in coating. The solvent chosen should be sufficiently volatile such that it evaporates or otherwise substantially flashes off in a relatively short time subsequent to deposition, its purpose as a carrier for the ester and prepolymer components being completed. Low molecular weight, low boiling point solvents are therefore preferred. For example, solvents having a maximum molecular weight of about 200° C. and a maximum boiling point of about 150° C. are useful. It is also preferred that the solvents chosen be capable of substantially evaporating under ambient conditions within a time period of about ten (10) minutes or less. Specific examples of suitable solvents include ethylacetate, n-propylacetate, hexane, toluene, xylene and butan-2-one. The solvent should be used in amounts sufficient to allow for deposition of a continuous coating on the substrate such that enhanced adhesion can be obtained. Preferably, the solvent is present in amounts of about 50% to about 80% by weight of a composition.

It has been determined that the composition best exhibits the enhanced adhesion results on a variety of substrates when it is present as a substantially continuous film on the substrate. Thus, the composition must be capable of forming a substantially continuous film on the substrate surface once the solvent carrier has evaporated. Towards this end, the solids content of the composition should be sufficient to accomplish such a film. In most cases, the continuity of the film is easily observed by its color or textural characteristics. The film should be present on the entire surface area to be bonded to achieve maximum adhesion results.

The compositions of the present invention may be used on a variety of different surfaces. Steel, aluminum, copper and zinc bichromate are among those metallic surfaces on which enhanced adhesion may be obtained using the present compositions. In addition, the present invention may be used on naturally difficult to bond to substrates such as non-ferrous materials, plastic and wood.

The polyurethane adhesives useful in conjunction with the preferred embodiment of the present invention may be chosen from any of those known in the art. Both one-part polyurethane adhesives and two-part polyurethane adhesives are useful. Polyurethanes are generally formed by the reaction of a diisocyanate with a polyol. This reaction is generally a step-growth polymerization and is often referred to as a polyaddition or rearrangement polymerization. Examples of polyurethane compositions useful in the present invention include those which are made from the reaction of diisocyanates such as 4,4'-diphenylmethane diisocyanate (MDI), toluene diisocyanate (TDI), 1,6-hexamethylene diisocyanate (HDI) or isophorone diisocyanate (IPDI) with polyesterpolyols or polyetherpolyols of molecular weight of about 200 to about 2000, e.g. those sold under the tradename Desmophen by Bayer AG.

The present invention also relates to a method of improving adhesion and durability of adhesive bonds by applying to a substrate surface an adhesion promoter composition comprising (i) an ester selected from the group consisting of maleic-modified esters of rosin, dialkylmalonates and mixtures thereof; (ii) a polyisocyanate prepolymer; and (iii) a solvent carrier substantially unreactive to said prepolymer and ester components. The present invention also relates to a new use for compositions containing maleic-modified esters of rosin, dialkylmalonates and polyisocyanate prepolymer compositions.

The present invention also relates to articles having at least one surface conditioned for enhanced adhesion to polyurethane-based adhesives. These articles, as previously mentioned, may be selected from metallic, thermoplastic, composites or wood materials. Application of the adhesion promoter composition to the substrate surface may be effectuated by dipping, brushing, spraying or other deposition means for providing an adequate coating to the area to be bonded.

The present invention can be combined with a variety of other materials including other adhesion promoters such as silanes and may also contain compounds useful in the acceleration or initiation of adhesive cure.

As previously mentioned, the present invention can be varied in the number of ways to allow for use with a variety of adhesive systems. In doing so, the particular prepolymer chosen must be suitable, i.e. compatible with and/or functionally reactive with the adhesive of choice. Thus, the prepolymer component is intended to have affinity for and provide a "link" to specific adhesive classes.

In a broader aspect, the present invention also relates to adhesion promoter compositions which can be used with either polycondensate-formed or polyaddition formed adhesive compositions. These promoter compositions include (i) an ester of an unsaturated dicarboxylic acid and a polyol or polyetherpolyol; (ii) a prepolymer having functional groups selected from the group consisting of hydroxyl, amino and carboxylic groups; and (iii) a solvent. Examples of unsaturated dicarboxylic acids include those selected from the classes of alkyl, alkenyl, alkynl, cycloaliphatic and aromatic dicarboxylic acids. For example, acetylenic dicarboxylic acid, cyclopentadiene dicarboxylic acid, cyclohexadiene dicarboxylic acid, pentenedicarboxylic acid and the like. Examples of useful polyols or polyetherpolyols used in conjunction with these acids to form the ester include those compounds having at least two hydroxyl groups and having a molecular weight in the range of about 200 to about 2000.

The invention may be further understood with reference to the following non-limiting examples. Unless otherwise indicated, tensile strength results of 4.0 $N/mm^2$ or higher using polyurethane adhesive Loctite 3951 indicate cohesive failure, i.e. failure within the adhesive. Results lower than this usually indicated adhesive failure, i.e. failure at the adhesive/substrate interface.

EXAMPLE 1

The following inventive adhesion promotion composition was prepared in accordance with the present invention.

COMPOSITION A

| Component | Parts by Weight |
|---|---|
| Butan-2-one (solvent) | 61.0 |
| Maleic-modified glycerol ester of rosin | 15.0 |
| P-toluene-sulfonyl-isocyanide | 0.5 |
| Diethylmalonate | 0.5 |
| Aliphatic polyisocyanate[1] | 18.5 |
| Silane[2] | 4.5 |

[1]65% aliphatic polyisocyanate prepolymer in solvent naphtha 100/1-methoxypropylacetate-2, 4:1 (Bayer AG).
[2]γ-glycidoxypropyl trimethoxy silane (Union Carbide).

This composition was formed by admixing each of the components together to form a homogenous solution. Standard lapshear specimens having a bond area of 1"×0.5" and a bond gap of about 3 mm (ASTM D 1002 modified) were made from mild steel, zinc bichromate and aluminum and their bonding surfaces coated with inventive composition A. Equivalent lapshear specimens were primed with three commercially available adhesion promoter compositions designed for use with polyurethane adhesives. A set of control lapshear specimens were used without primer.

The competitive metal primers used had the following compositions:

| | |
|---|---|
| Sika 210T: | Bisphenol A Epoxy in xylene/methanol/ethylacetate solvent mixture. |
| Sika 204: | Polyvinylbutyral-phenolic resin combination and 0.1% zinc chromate in isopropanol. |
| Teroson 102: | 1% polyether in ethanol. |

The lapshear specimens prepared above were tested for tensile strength in accordance with ASTM D1002/DIN 53283. The adhesive used in each test was a one-part polyurethane elastomeric adhesive designed to cure at ambient temperature under the influence of atmospheric moisture. This polyurethane adhesive is sold under the tradename Loctite 3951 by Loctite Corporation, Hartford, Conn. The results are summarized in Table I.

The lapshear specimens were placed in controlled heat and humidity conditions for up to six weeks, as indicated, prior to tensile testing. Tensile testing was performed at room temperature using an Instron Testing Machine Nos. 1185 and 4507.

TABLE I

TENSILE STRENGTHS ($N/mm^2$)

| Substrate/Exposure Conditions | Adhesion Promoters | | | | |
|---|---|---|---|---|---|
| | A | Composition Control | 210T | 204 | 102 |
| **Mild Steel** | | | | | |
| 1 WK/22° C./50% RH | 6.0 | 0.8 | 1.5 | 5.2 | 0.6 |
| 1 WK/22° C./50% RH + 1 WK/40° C./98% RH | 6.0 | 0.7 | 9.6 | 2.3 | 1.2 |
| 1 WK/22° C./50% RH + 3 WKS/40° C./98% RH | 6.0 | 0.6 | 9.0 | 1.3 | 0.3 |
| **Zinc Bichromate** | | | | | |
| 1 WK/22° C./50% RH | 4.9 | 0.5 | 0.7 | 7.8 | 0.3 |
| 1 WK/22° C./50% RH + 1 WK/40° C./98% RH | 4.6 | 0.4 | 2.5 | 1.2 | 1.9 |
| 1 WK/22° C./50% RH + 3 WKS/40° C./98% RH | 4.2 | 0.4 | 3.0 | 1.0 | 0.7 |
| **Aluminum** | | | | | |
| 1 WK/22° C./50% RH | 4.5 | 2.4 | 1.8 | 5.6 | 0.6 |
| 1 WK/22° C./50% RH + 1 WK/40° C./98% RH | 4.1 | 0.8 | 4.7 | 1.5 | 2.5 |
| 1 WK/22° C./50% RH + 3 WKS/40° C./98% RH | 4.0 | 0.8 | 3.3 | 1.5 | 0.9 |

As is apparent from the results on Table I, the inventive adhesion promoter compositions exhibited tensile strengths which were extremely durable throughout the heat/humidity exposure periods on all three metal surfaces. Of particular significance is the retention of adhesive properties on zinc bichromate and aluminum as compared to the control and the commercially available primers. This is an indication of adhesive durability and the ability to prevent moisture from penetrating the adhesive/substrate interface, thereby weakening the bond.

EXAMPLE 2

The following comparative and inventive adhesion promoter compositions were prepared in accordance with the invention. Composition B is devoid of adhesion promoter, whereas compositions C and D contain diethylmalonate and are representative of the inventive compositions.

| Component | Compositions (Parts by Weight) | | |
|---|---|---|---|
| | B | C | D |
| Butan-2-one (Solvent) | 65.00 | 65.00 | 65.00 |
| Saturated polyester resin[3] | 10.69 | 10.69 | 10.69 |
| Diethylmalonate | — | 0.50 | 2.50 |
| Aliphatic polyisocyanate[1] | 24.44 | 24.44 | 24.44 |
| Silane[2] | 2.00 | 2.00 | 2.00 |

[1]65% aliphatic polycocyanate prepolymer in solvent napha 100/1-methoxypropylacetate-2, 4:1 (Bayer AG).
[2]γ-glycidoxypropyl trimethoxy silane (Union Carbide).
[3]Dynapol L206 (Hüls)

Lapshears were prepared and tested in the same manner and using the same polyurethane adhesive composition as in Example 1. The results, tabulated in Table II, further indicate the ability of the inventive primer compositions to provide enhanced adhesion under extended conditions of heat and humidity.

TABLE II

TENSILE SHEAR STRENGTHS ($N/mm^2$)

| Substrate/Exposure Conditions | Compositions | | |
|---|---|---|---|
| | B | C | D |
| **Mild Steel** | | | |
| 1 WK/22° C./50% RH | 3.5 | 7.6 | 8.7 |
| 1 WK/22° C./50% RH + 1 WK/40° C./98% RH | 4.1 | 9.9 | 7.0 |
| 1 WK/22° C./50% RH + 3 WKS/40° C./98% RH | 2.9 | 8.8 | 10.3 |
| **Zinc Bichromate** | | | |
| 1 WK/22° C./50% RH | 2.2 | 5.8 | 8.3 |
| 1 WK/22° C./50% RH + 1 WK/40° C./98% RH | 2.1 | 5.4 | 5.0 |
| 1 WK/22° C./50% RH + 3 WKS/40° C./98% RH | 1.2 | 3.8 | 2.7 |
| **Aluminum** | | | |
| 1 WK/22° C./50% RH | 2.3 | 4.9 | 5.5 |
| 1 WK/22° C./50% RH + 1 WK/40° C./98% RH | 2.1 | 1.9 | 2.9 |
| 1 WK/22° C./50% RH + 3 WKS/40° C./98% RH | 1.3 | 1.5 | 1.4 |

EXAMPLE 3

The following inventive compositions E and G as well as comparative composition F were prepared:

| Component | Compositions (Parts by Weight) | | |
|---|---|---|---|
| | E | F | G |
| Butan-2-one (solvent) | 60.51 | 65.00 | 65.01 |
| Saturated polyester resin[3] | — | 10.69 | — |
| Maleic-modified glycerol ester of rosin | — | — | 10.02 |
| Diethylmalonate | 0.50 | — | — |
| Aliphatic polyisocyanate[1] | 35.03 | 24.44 | 20.02 |
| Silane[2] | 4.01 | 2.00 | 4.51 |

[1]65% aliphatic polyisocyanate prepolymer in solvent naphtha 100/1-methoxypropylacetate-2, 4:1 (Bayer AG).
[2]γ-glycidoxypropyl trimethoxy silane (Union Carbide).
[3]Dynapol L206 (Hüls).

Lapshears were again prepared and tested in the same manner and using the same polyurethane adhesive as in Example I. The results, set forth in Table III, demonstrates the effectiveness of the inventive compositions in providing enhanced adhesion and adhesion durability under extended conditions of heat and humidity. It should be noted that the lower results of Composition E are attributed to the low viscosity of the composition due to the absence of sufficient film-forming solids, i.e. polyester resin, such that a substantially continuous film was not formed.

Composition F is a comparative composition without the use of the esters of rosin or malonic acid, but containing polyester resin solids.

TABLE III

TENSILE SHEAR STRENGTHS (N/mm[2])

| Substrate/Exposure Conditions | Compositions E | F | G |
|---|---|---|---|
| Mild Steel | | | |
| 1 WK/22° C./50% RH | 4.6 | 3.5 | 7.0 |
| 1 WK/22° C./50% RH + 1 WK/40° C./98% RH | 4.1 | 4.1 | 5.0 |
| 1 WK/22° C./50% RH + 3 WKS/40° C./98% RH | 3.9 | 2.9 | 3.4 |
| Zinc Bichromate | | | |
| 1 WK/22° C./50% RH | 1.5 | 2.2 | 1.8 |
| 1 WK/22° C./50% RH + 1 WK/40° C./98% RH | 0.6 | 2.1 | 3.0 |
| 1 WK/22° C./50% RH + 3 WKS/40° C./98% RH | 1.6 | 1.2 | 1.6 |
| Aluminum | | | |
| 1 WK/22° C./50% RH | 1.7 | 2.3 | 6.6 |
| 1 WK/22° C./50% RH + 1 WK/40° C./98% RH | 1.0 | 2.1 | 1.8 |
| 1 WK/22° C./50% RH + 3 WKS/40° C./98% RH | 1.1 | 1.3 | 1.0 |

EXAMPLE 4

The following compositions were prepared to demonstrate the enhanced adhesion properties of compositions containing the maleic-modified glycerol esters of rosin as compared with non-maleic-modified esters of rosin. The non-maleic-modified esters of rosin were polymerized rosins marketed by Hercules Inc. and Hercules B.V. under the tradenames Dymerex and Pentalyn C.

| Component | Compositions (Parts by Weight) J | K | L | M |
|---|---|---|---|---|
| Butan-2-one (solvent) | 52.3 | 52.3 | 52.3 | 52.3 |
| Maleic-modified glycerol ester of rosin | 14.3 | — | — | — |
| Polymerized rosin (predominately dimeric acids derived from rosin)[1] | — | 14.3 | — | — |
| Pentaerythritol ester of polymerized rosin[2] | — | — | 14.3 | — |
| Maleic-modified pentaerythritol ester of rosin[3] | — | — | — | 14.3 |
| Aliphatic polyisocyanate prepolymer[4] | 28.5 | 28.5 | 28.5 | 28.5 |
| Plasticizer[5] | 2.4 | 2.4 | 2.4 | 2.4 |
| Silane[6] | 2.4 | 2.4 | 2.4 | 2.4 |

[1]Sold by Hercules, Inc. under the tradename Dymerex.
[2]Sold by Hercules, Inc., BV under the tradename Pentalyn C.
[3]Sold by Hercules, Inc., BV under the tradename Pentalyn G.
[4]65% aliphatic polyisocyanate prepolymer in solvent naphtha 100/1-methoxypropylacetate-2, 4:1 (Bayer AG)
[5]Alkyl sulfonic acid ester of phenol (Tradename Mesamoll, Bayer AG).
[6]γ-glycidoxypropyl trimethoxy silane.

Lapshear specimens were prepared and tested in the same manner and using the same polyurethane adhesive compositions as Example 1. The results, tabulated in Table V, indicate that non-maleic-modified esters of rosin (Compositions K, L) do not provide the enhanced adhesion as compared to the inventive compositions (J, M) on each of the different metallic substrates.

TABLE IV

TENSILE SHEAR STRENGTHS (N/mm[2])

| Substrate/Exposure Conditions | Compositions J | K | L | M |
|---|---|---|---|---|
| Mild Steel | | | | |
| 1 WK/22° C./50% RH | 8.9 | 8.0 | 1.5 | 7.0 |
| 1 WK/22° C./50% RH + 1 WK/40° C./98% RH | 9.1 | 4.1 | 3.3 | 7.8 |
| 1 WK/22° C./50% RH + 3 WKS/40° C./98% RH | 7.6 | 2.6 | 3.1 | 6.3 |
| Zinc Bichromate | | | | |
| 1 WK/22° C./50% RH | 8.6 | 7.1 | 2.1 | 7.6 |
| 1 WK/22° C./50% RH + 1 WK/40° C./98% RH | 3.2 | 3.4 | 1.8 | 2.6 |
| 1 WK/22° C./50% RH + 3 WKS/40° C./98% RH | 2.3 | 4.2 | 1.8 | 1.2 |
| Aluminum | | | | |
| 1 WK/22° C./50% RH | 1.5 | 0.4 | 1.2 | 1.6 |
| 1 WK/22° C./50% RH + 1 WK/40° C./98% RH | 4.1 | 0.4 | 0.9 | 1.7 |
| 1 WK/22° C./50% RH + 3 WKS/40° C./98% RH | 6.1 | 0.4 | 1.0 | 1.0 |

EXAMPLE 5

Inventive Composition A was used to prepare lapshear specimens made from various metallic substrates following the same procedure and using the same polyurethane adhesive as in Example 1. The results, shown in Table V, emphasize the excellent adhesion durability on metallic surfaces such as copper, stainless steel and mild steel, where only a minimal amount of tensile bond strength is lost even after extended periods of heat and humidity. In the case of mild steel, additional extended exposures at 80° C. and 100° C. subsequent to humidity exposure still demonstrated excellent durability of adhesion.

TABLE V

TENSILE SHEAR STRENGTHS (N/mm[2])

| Substrate/Exposure Conditions | Copper | Stainless Steel |
|---|---|---|
| 1 WK/22° C./50% RH | 5.2 | 2.2 |
| 1 WK/22° C./50% RH + 1 WK/40° C./98% RH | 5.1 | 2.4 |
| 1 WK/22° C./50% RH + 3 WKS/40° C./98% RH | 5.2 | 2.4 |
| 1 WK/22° C./50% RH + 4 WKS/40° C./98% RH | 4.6 | 1.0 |
| | Mild Steel | |
| 1 WK/22° C./50% RH | 6.0 | |
| 1 WK/22° C./50% RH + 1 WK/80° C. | 11.0 | |
| 1 WK/22° C./50% RH + 3 WKS/80° C. | 10.7 | |
| 1 WK/22° C./50% RH + 6 WKS/80° C. | 8.1 | |
| 1 WK/22° C./50% RH + 1 WK/100° C. | 8.6 | |
| 1 WK/22° C./50% RH + 3 WKS/100° C. | 6.1 | |
| 1 WK/22° C./50% RH + 6 WKS/100° C. | 4.7 | |

EXAMPLE 6

This example is intended to demonstrate the usefulness and durability of adhesion obtained from compositions of the present invention when used on a variety of different surfaces, including plastics, composites, wood and enamel coated steel as compared to lapshear joints made without primer. Inventive Composition A was used on lapshears made from each of the listed materials and prepared and tested in accordance with Example 1. The tensile shear results, shown in Table VI, clearly demonstrate that the inventive primer compositions provided enhanced adhesion and durability under extended exposures to heat and humidity when compared to those specimens on which primer was not used (Table VII).

TABLE VI

TENSILE SHEAR STRENGTHS ($N/mm^2$)

| | Substrate (with Composition A Primer) | | | | | | |
|---|---|---|---|---|---|---|---|
| Exposure Conditions | GRP[1] | Polycarbonate | ABS[2] | PVC[3] | Wood (Teak) | Painted Steel[4] | Laminated Glass/ Polycarbonate[5] |
| 1 WK/22° C./50% RH | 8.6 | 5.5 | 5.4 | 7.8 | 3.0 | 5.0 | 3.0 |
| 1 WK/22° C./50% RH + 1 WK/40° C./98% RH | 4.8 | 6.0 | 5.4 | 7.7 | 3.2 | 7.1 | 3.4 |
| 1 WK/22° C./50% RH + 3 WKS/40° C./98% RH | 3.1 | 6.0 | 5.4 | 7.2 | 3.1 | 7.0 | 3.4 |
| 1 WK/22° C./50% RH + 6 WKS/40° C./98% RH | 4.6 | 5.7 | 4.6 | 6.3 | 2.8 | 4.5 | 3.4 |

[1]Glass reinforced polyester
[2]Acrylonitrile/butadiene/styrene
[3]Polyvinylchloride
[4]Two-part auto paint (baked enamel)
[5]Auto-windscreen bonded to polycarbonate

TABLE VII

TENSILE SHEAR STRENGTHS ($N/mm^2$)

| | Substrate (Without Primer) | | | | |
|---|---|---|---|---|---|
| Exposure Conditions | GRP | Poly-carbonate | ABS | PVC | Wood (Teak) |
| 1 Rm. Temp. | 6.5 | 1.8 | 1.0 | 1.3 | 2.4 |
| 1 Wk Rm. Temp. + 1 Wk/ 40° C./98% RH | 6.9 | 1.5 | 1.2 | 1.9 | 1.0 |
| 1 Wk Rm. Temp. + 3 Wks/ 40° C./98% RH | 7.0 | 1.1 | 0.9 | 1.5 | 1.9 |
| 1 Wk Rm. Temp. + 6 Wks/ 40° C./98% RH | 6.0 | 1.1 | 1.1 | 1.7 | 2.1 |

The invention being thus described, it will be obvious that the same may be varied in many ways. Such variations are not to be regarded as a departure from the spirit and scope of the invention and all such modifications are intended to be included within the scope of the following claims.

What is claimed is:

1. An adhesion promoter composition for conditioning at room temperature a surface to be bonded comprising a combination of:

(i) an ester component selected from the group consisting of maleic modified esters of rosin, dialkyl malonates and mixtures thereof;

(ii) a polyisocyanatc prepolymer component having isocyanate functional groups thereon which in the presence of component (i) react at room temperature with a subsequently applied polyurethane adhesive composition.

2. The adhesion promoter composition of claim 1 further including (iii) a solvent carrier component.

3. The adhesion promoter composition of claim 2 wherein components (i) and (ii) exist as independent components.

4. The composition of claim 1 wherein the rosin ester is selected from the group consisting of the maleic-modified glycerol ester of rosin, maleic-modified pentaerythritol ester of rosin, maleic-modified ethylene glycol ester of rosin, maleic-modified mesitylene glycerol ester of rosin and mixtures thereof.

5. The composition of claim 4 wherein the rosin esters are present in amounts of about 5% to about 20% by weight.

6. The composition of claim 1 wherein the dialkylmalonates are selected from the group consisting of $C_{1-10}$ alkyl esters of malonic acid.

7. The composition of claim 6 wherein the diakylmalomate is present in amounts of about 0.1% to about 10% by weight.

8. The composition of claim 7 wherein the dialkylmalonate is diethylmalonate.

9. The composition of claim 1 wherein the polyisocyanate prepolymer has a molecular weight in the range of about 500 to about 10,000.

10. The composition of claim 1 wherein the solvent is aprotic.

11. The composition of claim 10 wherein the solvent is selected from the group consisting of ketones, esters and hydrocarbons.

12. The composition of claim 1 substantially free from water.

13. The composition of claim 1 in aerosol form.

14. The composition of claim 1 for use on metallic surfaces.

15. The composition of claim 14 wherein the metallic surfaces are selected from the group consisting of steel, aluminum, copper and zinc bichromate.

16. The composition of claim 1 for use on a non-metallic surface.

17. The composition of claim 16 wherein the non-metallic surface is a thermoplastic, synthetic composite or wood.

* * * * *